US005106260A

United States Patent [19]

Obrecht

[11] Patent Number: 5,106,260

[45] Date of Patent: Apr. 21, 1992

[54] METHOD AND AN APPARATUS FOR SINGLING STACKED CARDS

[75] Inventor: Werner Obrecht, Wielenbach, Fed. Rep. of Germany

[73] Assignee: GAO Gesellschaft fuer Automation und Organisation MbH, Fed. Rep. of Germany

[21] Appl. No.: 332,717

[22] Filed: Apr. 3, 1989

[30] Foreign Application Priority Data

Apr. 26, 1988 [DE] Fed. Rep. of Germany ....... 3814075

[51] Int. Cl.[5] .............................................. B65G 59/04

[52] U.S. Cl. ................................. 414/796.6; 271/104; 271/105; 414/797; 414/797.8; 414/786

[58] Field of Search ....................... 271/104, 105, 106; 414/796.6, 797, 797.8, 786

[56] References Cited

U.S. PATENT DOCUMENTS

| | | | |
|---|---|---|---|
| 2,203,823 | 6/1940 | Jirousek . | |
| 3,385,593 | 5/1968 | Snellman . | |
| 4,370,092 | 1/1983 | Healy | 414/797 X |
| 4,466,764 | 8/1984 | Hutter, III | 414/796.6 |
| 4,508,331 | 4/1985 | Kashiwagi | 271/107 |
| 4,580,771 | 4/1986 | Smith | 271/105 X |
| 4,824,308 | 4/1989 | Carboniero et al. | 271/105 X |

FOREIGN PATENT DOCUMENTS

| | | | |
|---|---|---|---|
| 110291 | 6/1984 | European Pat. Off. . | |
| 2413072 | 10/1975 | Fed. Rep. of Germany . | |
| 306582 | 2/1929 | United Kingdom . | |
| 1513489 | 6/1978 | United Kingdom . | |
| 8002547 | 11/1980 | World Int. Prop. O. | 271/19 |

OTHER PUBLICATIONS

Copies of these patents were submitted by Applicant with the European Search Report filed Dec. 12, 1990 or were submitted with Amendment A filed Mar. 26, 1990.

*Primary Examiner*—David A. Bucci
*Assistant Examiner*—Janice Krizek
*Attorney, Agent, or Firm*—Andrus, Sceales, Starke & Sawall

[57] ABSTRACT

In a method and an apparatus for singling cards such as check cards or identity cards, each card to be singled is moved beforehand into a singling groove, thereby passing out of the area of a stop holding the stack. The card thus presingled is thereupon taken completely off the stack using a suitable removing sucker. In this way, cards can be singled very reliably and gently.

26 Claims, 4 Drawing Sheets

METHOD AND AN APPARATUS FOR SINGLING STACKED CARDS

Figure 1:
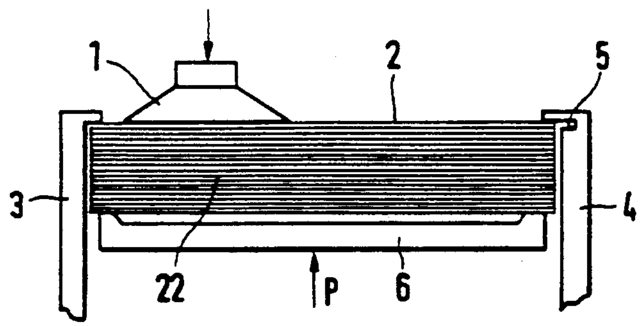
Figure 2:
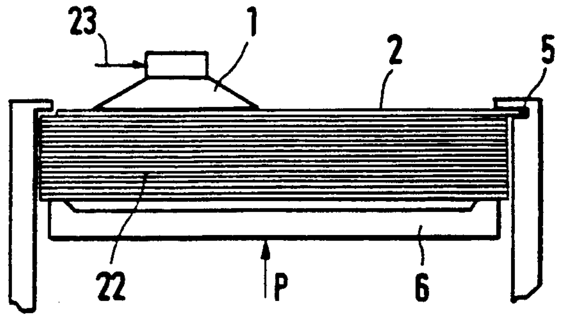
Figure 3:
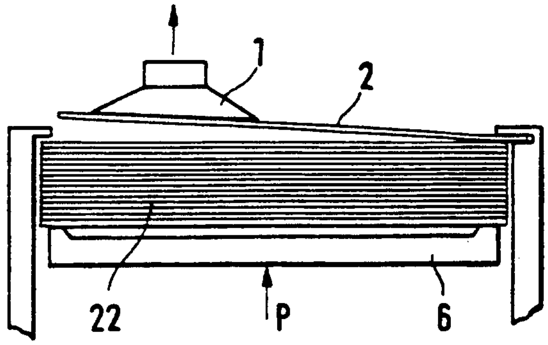

The present invention relates to a method for singling stacked cards such as check cards, identity cards and the like.

The known singling apparatus usually comprises a shaft, or tubular receptacle containing the stack of cards. If the stack is worked off from above, lateral stops are provided that overlap the uppermost card and hold it and the following cards to be singled on the stack. A removing means removes each uppermost card from the area of the stops and transfers it to a transport system.

Such singling apparatus are known from a number of publications; reference is made in this connection to German patent no. 15 61 165, German laid open print no. 24 13 072 and German laid open print no. 26 54 108.

In the known singling apparatus, a removing means having a sucker first pushes each uppermost card of the stack with its trailing edge against the wall of the magazine or singling shaft, contrary to the withdrawal direction, thereby arching the card as a whole. The movement is continued until the leading edge passes out of the area of a front stop holding down the stack. In the further course of singling, the leading area of the card is raised from the stack and transferred in the singling direction to a transport system for further processing. The stack of cards, which is spring-loaded from below, now pushes the next card to the stops and the singling operation is repeated.

This singling method requires the recording medium to arch in the particular desired direction, which is monitored by appropriate sensors. Apart from the additional effort caused by the sensors, this method requires a certain degree of flexibility on the part of the individual cards. Should the stack as a whole be deformed contrary to the direction of the desired arching, singling is impossible from the start. If the cards stick together firmly due to electrostatic charge or dirt, double draws cannot be avoided. Since there is a danger of double draws, additional sensors must again be installed.

Another class of singlers, the "friction roller singlers," use rollers coated with frictional coverings which remove the uppermost card from the stack and transfer it to a transport system for further processing. A general disadvantage of this system is the high wear of the frictional rollers due to dirt, which means they must be frequently replaced and the system stopped. It is also difficult to observe exact clocking and to avoid double draws. During singling the cards rub against each other over their entire length, which, in the case of identity cards, for example, easily causes scratches that may considerably impair the appearance of the card. Cards with elevated areas, e.g. embossed areas, cannot be singled by this method at all.

The invention has as its affect providing a method and an apparatus for singling cards such as identity cards, check cards and the like, which reliably avoid double draws and are gentle to the cards.

This object is achieved according to the invention by the features stated in the claims. Advantageous developments are the subject of the subclaims.

An essential feature of the invention is that a presingling takes place prior to the actual singling. An element acting in form-fitting fashion on the card to be singled ensures that only one card can be displaced relative to the stack by a small distance compared to the dimensions of the card. This displacement causes one edge of the card to pass out of the area of the stop holding this edge, so that the card can then be taken off the stack by a suitable removing means.

The element acting in form-fitting fashion on the card to be singled may, in one embodiment of the invention, be a singling groove which is provided on the opposite side of the stop holding down the leading edge of the card, and into which the trailing edge of a card displaced contrary to the singling direction can fit.

The width of the groove is only slightly greater than the card thickness, so that only one card can pass into the singling groove.

The depth of the singling groove is such that when the card has fit completely into the groove its leading edge (in terms of the singling direction) has passed out of the area of the stop holding down this edge, so that the card can threafter be taken off by a suitable removing means.

The inventive solution singles cards reliably and avoids double draws in every case.

Should two cards stick together so firmly that they do not come apart and thus the uppermost card cannot be pushed into the singling groove, there is a singling gap. The cards that cannot be singled are removed and the singling operation then continued. The resulting singling gap is much less critical than double draws that are not recognized by the system. The latter impair the counting reliability and the processing in subsequent units. Since the inventive measures prevent double draws from occurring, one can dispense with means for detecting double draws.

The cards are singled gently, since their friction against each other is limited to a minimal distance relative to their length.

It has proven advantageous to provide the singling groove on the back edge of the stack substantially in the middle of the cards and to design the upper groove wall at the same time as a stop for the stack of cards. This wall must for this purpose be advanced a small distance toward the middle of the cards. Due to this construction it is virtually impossible for the cards to jam when being pushed back.

The relative movement between the card to be singled and the stack can be performed in different ways.

According to a first embodiment, the card is pushed back and removed by a removing means having a sucker that is placed on the uppermost card, pushes back the card into the singling groove, raises it from the stack and then transfers it to a transport system for further processing. The suction power is set so as to ensure that the card is removed even if the stack counterpressure varies within wide limits. The sucker can be moved at high speed due to the small masses to be moved. The vacuum of the suction air can be briefly increased in accordance with appropriate sensor signals. For example, a microswitch can be provided in the singling groove for reporting whether or not a card has been pushed into the singling groove.

According to another embodiment, the presingling can be performed by a separate slide which acts on the leading edge of the card to be singled, first pushing it contrary to the singling direction into the singling groove. Such a construction is advantageous in that it is easier to direct the sucker and the vacuum of the suction air need not be as high.

Finally, it is also possible to perform the presingling by moving the stack accordingly relative to the card to be singled. This embodiement is suitable for lower singling frequencies, since the masses to be moved are accordingly greater.

Figure 6:
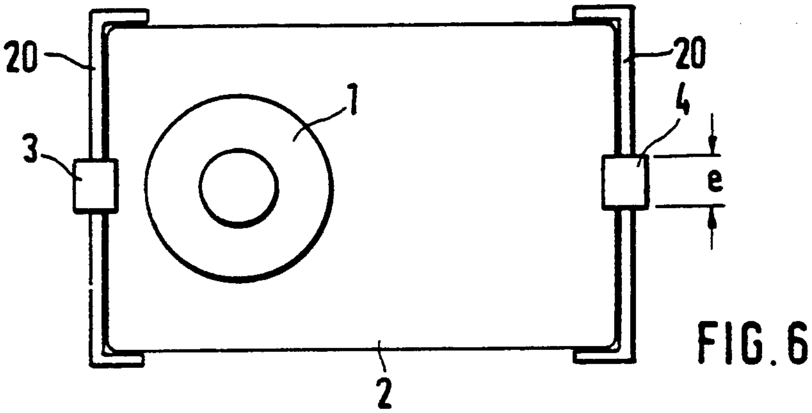
Figure 7:
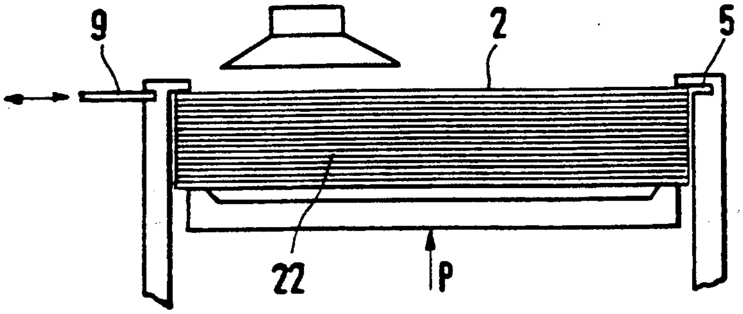
Figure 8:
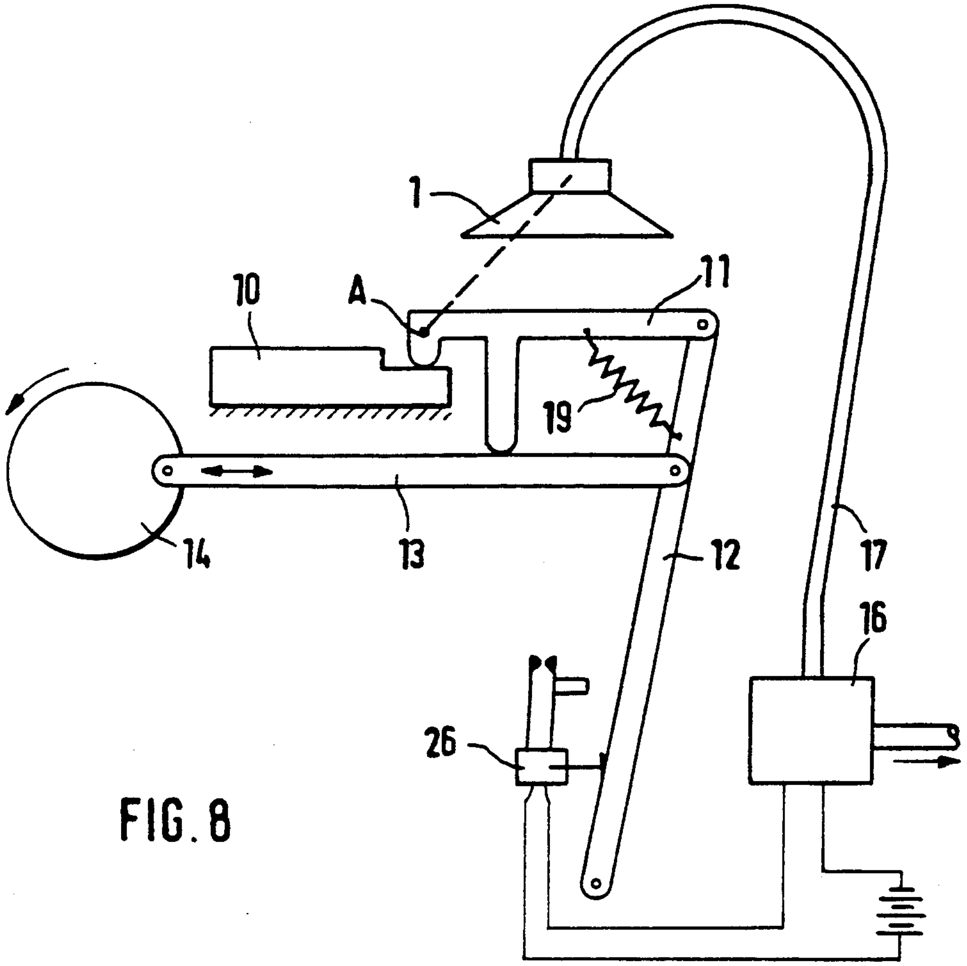
Figure 10:
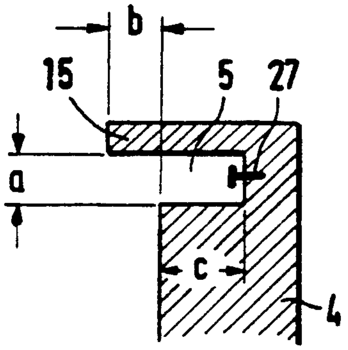
Figure 9:
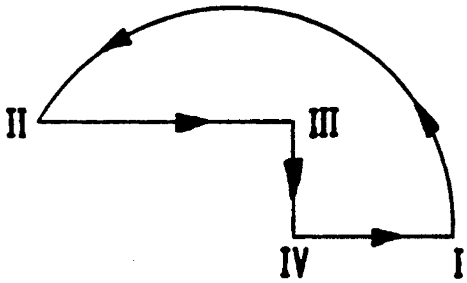
Figure 11A:
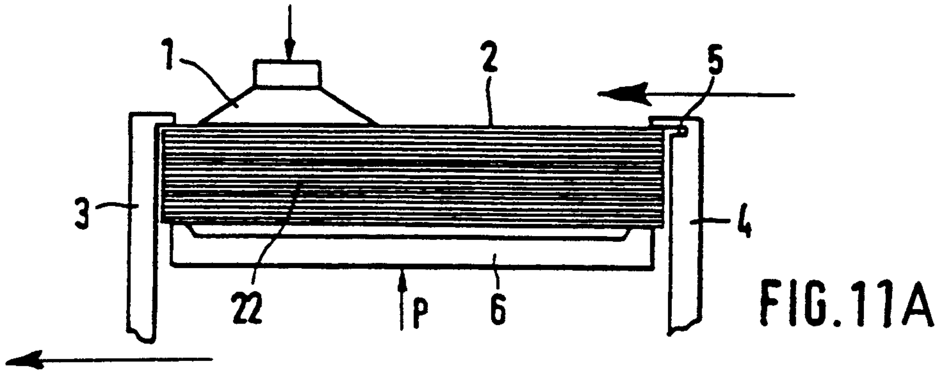
Figure 11B:
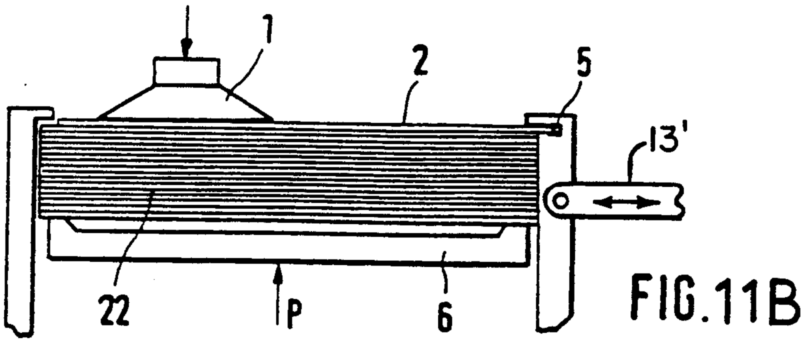

In the following, embodiments of the invention shall be described by way of example with reference to the enclosed drawings, in which FIGS. 1 to 5 show the singling sequence in a schematically shown first embodiment, FIG. 6 shows a schematic top view of the stack of cards of the first embodiment with the sucker, FIG. 7 shows a schematic view of a second embodiment, FIG. 8 shows a lever mechanism for directing the sucker, FIG. 9 shows the schematic path of the sucker directed by the lever gear shown in FIG. 8, FIG. 10 shows a cross-section of the singling groove, and FIGS. 11A and 11B show schematic views of an additional embodiment of the invention A first embodiment of the card singling apparatus is shown schematically in FIGS. 1 to 6. In a singling shaft or tube-like receptacle, indicated in FIG. 6 by frame parts 20, a stack of cards 22 is located. The stack rests on a base plate 6 which is pushed upwardly with a certain power P to the extent to which the stack height decreases as a result of the cards being singled and removed. In the case shown, the base plate provides a pressure load to the stack of cards only in the area in the leading and trailing edges of the cards, thereby eliminating adverse influences due to the cards arching about the transverse axis. Base plate 6 may also be hinged to a connecting rod (not shown in the figures) via which power P is transmitted to base plate 6. This allows for stacks which are not of equal thickness to be supplied without any problem. It is also possible to dispense with the base plate shown in the figures and to load the stack in the middle of the cards with the aid of a suitable connecting rod.

At the leading edge (in terms of the singling direction) there is a stop 3 and at the trailing edge a stop 4 which support the formation of the stack and each have on the top an edge 15 projecting into the singling shaft (FIG. 10) that constitutes a stop for a stack of cards 22 pressed upwardly from below by base plate 6. At the height of the uppermost card a singling groove 5 is formed below projecting edge 15 of stop 4, which is shown again in cross-section in FIG. 10. The gap width of the groove is about 1.2 to 1.3 times the card thickness (dimension a), the depth of the groove is about 2 mm (dimension c) and the projecting part of stop 4 protrudes inwardly about 1.7 mm toward the middle of the cards (dimension b). As indicated by FIG. 6, which shows a top view of the singling apparatus, groove 5 or stop 4 are disposed in the area of the trailing edge only in the middle to facilitate the penetration of a card into the groove when the card is arched about the longitudinal axis. The width of the groove in the direction of the card edge (dimension e) is about 3 to 5 mm, for example. The stated dimensions are of course only intended for an embodiment of the apparatus for singling standardized cards. If the cards have other dimensions, the dimensions of the stops and the singling groove must be adapted accordingly.

The uppermost card is subjected to a sucker 1 in the front third, as shown in FIGS. 1 and 6. Sucker 1 is guided in restricted fashion, for example, by means of a lever gear. An example of such a lever guidance is described in connection with FIG. 8.

The singling operation takes place as follows. Sucker 1 is placed on uppermost card 2 and pushes it contrary to the singling direction (arrow 23 in FIG. 2) into singling groove 5. Since the thickness of the groove is such that only one card fits in, only one card will be pushed toward the right, i.e. contrary to the singling direction. When uppermost card 2 hits the bottom of singling groove 5 it is free from stop 3 holding down the leading edge of the card. The depth of the groove (dimension c) must therefore be somewhat greater than the length of projecting part 15 of stop 3. In the embodiment shown, the length of the projecting part is 1.7 mm, for example, whereas the depth of the groove can be about 2 mm. cards have other dimensions, the dimensions of the stops and the singling groove must be adapted accordingly.

The uppermost card is subjected to a sucker 1 in the front third, as shown in FIGS. 1 and 6. Sucker 1 is guided in restricted fashion, for example, by means of a lever gear. An example of such a lever guidance is described in connection with FIG. 8.

The singling operation takes place as follows. Sucker 1 is placed on uppermost card 2 and pushes it contrary to the singling direction (arrow 23 in FIG. 2) into singling groove 5. Since the thickness of the groove is such that only one card fits in, only one card will be pushed toward the right, i.e. contrary to the singling direction. When uppermost card 2 hits the bottom of singling groove 5 it is free from stop 3 holding down the leading edge of the card. The depth of the groove (dimension c) must therefore be somewhat greater than the length of projecting part 15 of stop 3. In the embodiment shown, the length of the projecting part is 1.7 mm, for example, whereas the depth of the groove can be about 2 mm.

In the singling groove a microswitch 27 may also be installed for reporting whether or not a card has been pushed into the groove. The signal can be utilized to increase briefly the vacuum on the sucker if a card cannot be pushed back with the vacuum normally applied.

Figure 4:
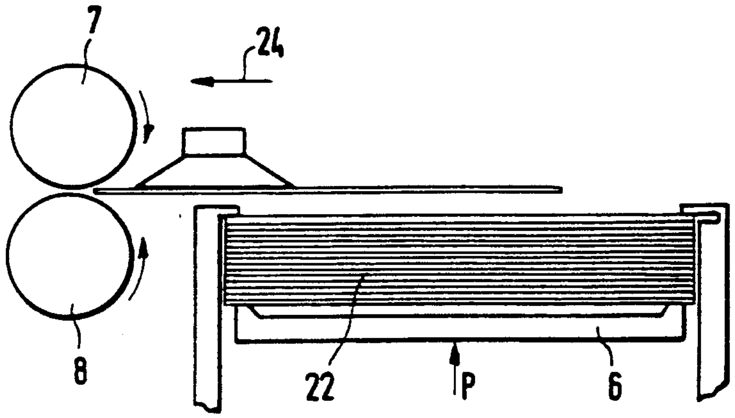
Figure 5:
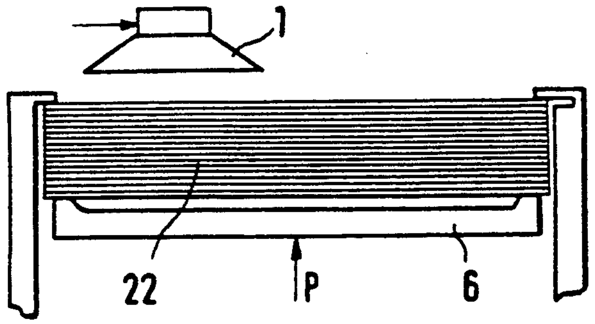

As soon as the leading edge of card 2 is free, sucker 1 raises the card and directs it in the singling direction following arrow 24 in FIG. 4, where it transfers it to a pair of feed rollers 7, 8 belonging to a transport system for further processing. The suction air is reduced or turned off at this time so that the card can be taken over by the rollers. The sucker is then moved back and placed from above on the next card now uppermost, whereupon the described process is repeated. To push the card back into the singling groove the vacuum or suction power can be briefly increased.

FIG. 8 shows a diagram of a lever mechanism for directing sucker 1. Sucker 1 is firmly connected to point A of the lever gear. This lever gear comprises a one-armed lever 12 having hinged substantially perpendicular to its end a lever 11 whose end describes the track curve which the sucker is to pass through. Lever 11 is supported on a further lever 13 which is hinged to lever 12, on the one hand, and performs a harmonic circular movement, on the other hand, which is effected by means of a crank gear 14. The end of lever 11 has a cam shape and is withdrawn via a stepped cam 10. The contact of cam-shaped end A of lever 11 with cam 10 is ensured by spring 19.

Sucker 1 is subjected to a vacuum via suction pipe 17 and valve 16. Valve 16 is monitored by a switch 26 which is activated by lever 12 when point A or the sucker has reached the position in which it must transfer the card removed from the stack to the transport system for further processing (compare FIG. 4).

The function of the lever gear will now be described with reference to FIG. 9. A rotation of crank gear 14 raises lever 13 which in turn presses lever 11 and thus point A upwardly. End A of lever 11 and thus sucker 1 move from points I to II on an upwardly slanting curved path. Depending on the portion of the curved path in which point A is deposited on cam 10, the curved area of the track already ends before II. At point II lever 12 activates switch 26 which in turn vents sucker 1 via valve 16; card 2 can be transferred at this point to transport rollers 7 and 8. Crank gear 14 now withdraws point A via lever 13 back to the right, whereby point A cannot describe a curved path since it is seated on cam 10. Sucker 1 therefore moves back at a certain constant height until it arrives at point III precisely above stack of cards 22. In this desired position it falls down from point III to point IV in accordance with the shape of cam 10, thereby coming in contact with the uppermost card of the stack and sucking it up. Crank gear 14 pushes the lever further to the right, now drawing point A toward the right on the lower area of the cam, which corresponds to a movement from point IV to point I. In position I the card is completely inserted into singling groove 5, the leading edge of card 2 is free from stop 3 and sucker 1 can raise the following card from the stack in the forward direction (compare FIG. 3).

Instead of the described lever mechanism, other means can also be used to direct the sucker; step motors, pneumatic or magnetic driving means are feasible.

FIG. 7 schematically indicates that the presingling, i.e. the lateral displacement of the uppermost card, can also be performed by a separate slide 9, which acts on the uppermost card in the area of its leading edge and pushes it into singling groove 5 in the described manner.

The movement of the sucker may also be simplfied in this embodiment. It must move back and forth, with reference to FIG. 9, along a path which is marked by points II, III, IV or IV, III, II.

Finally, the presingling can also be performed by accordingly moving the stack, as shown in FIGS. 11A and 11B. After the sucker has been placed on the card to be singled, the entire stack is moved, as shown by the arrows in FIG. 11A, and tilted or rotated in such a way as to push the card fixed by the sucker relative to the stack, into the singling groove. This may be accomplished by a lever 13', operating in the manner shown and described in connection with lever 13 and crank gear 14 of FIG. 8. The card is then raised from the stack and transferred to a transport system for further processing, if desired, in the manner shown in FIGS. 3 and 4.

In the embodiments shown in FIGS. 1 to 6, the stack to be singled is pressed upwardly by a base plate. It is also possible to use the force of gravity for power P and to single the lowermost card of a stack, whereby it basically suffices to turn the apparatus around. To make power P independent of the height or weight of the stack to be singled in such a case, one can provide two catching rollers on the side of the stack at a certain height for limiting the weight of the stack to that height of the stack which is located below these rollers. The weight of the cards located above these rollers is caught via frictional forces exerted on the edges of the cards by the rollers. These rollers are controlled in such a way that the lower part of the card shaft always has about the same number of cards.

However, to relieve the lowermost card one can also use slanted stack containers, which allow for only a partial component of the stack weight to act on the bottom card.

To hold down the cards in the area of their leading edges one may also provide two stops so that the stack is supported at three points. All stops can be hinged to frame parts 20 of the singling shaft in such a way that they can be swiveled away to fill the shaft with cards.

I claim:

1. A method for separating individual sheet-like elements from the end of a stack of such elements in a sequence in which the intervals between sequentially separated end elements is controlled with respect to time, said method employing a vacuum sucker movable in a pair of directions parallel to the planes of the sheet-like elements, said method comprising the steps of:

- positioning the stack of elements to be separated in a receptacle;
- engaging the end element of the stack with the sucker;
- displacing the end element relative to the remainder of the stack in a direction parallel to the planes of the elements by transverse movement of the sucker in a first direction;
- inserting the displaced end element in a singling groove formed in the receptacle, the width of said singling groove corresponding to the thickness of the end element;
- removing the displaced end element from the singling groove and the receptacle by transverse movement of the sucker in a second direction different than said first direction;
- releasing the end element from the sucker to discharge the end element; and
- repeating the foregoing steps on the next appearing end element, the release of successively removed end elements by the sucker occuring such that the end elements are discharged with intervals controlled with respect to time between them.

2. The method of claim 1 wherein the stack of elements is positioned in a receptacle having retaining means for retaining the stack in the receptacle and wherein the method is further defined as inserting the end element into the groove by an amount sufficient to disengage the end element from the retaining means to permit removal of the end element from the stack.

3. The method according to claim 1 wherein the vacuum of the sucker is briefly altered to displace the end element into the singling groove.

4. The method of claim 3 wherein the vacuum of the sucker is briefly increased to displace the end element into the singling groove.

5. The method of claim 3 wherein the singling groove has a sensor responsive to the presence or absence of the end element in the groove and wherein the vacuum of the sucker is controlled in accordance with the condition of the sensor.

6. A method for separating individual sheet-like elements from the end of a stack of such elements in a sequence in which the intervals between sequentially separated end elements is controlled with respect to time, said method employing a vacuum sucker movable parallel to the planes of the sheet-like elements, said method comprising the steps of:

engaging the end element of the stack with the sucker;

displacing the end element relative to the remainder of the stack in a direction parallel to the planes of the sheet-like elements by moving the remainder of the stack;

inserting the displaced end element in a singling groove, the width of which corresponds to the end element;

removing the displaced end element from the stack by movement of the sucker in a direction opposite to the relative direction of displacement of the end element;

releasing the end element from the sucker to discharge the end element; and repeating the foregoing steps on the next appearing end element, the release of successively removed end elements by the sucker occurring such that the end elements are discharged with intervals controlled with respect to time between them.

7. The method of claim 6 wherein the stack of elements is positioned in a receptacle having retaining means for retaining the stack in the receptacle and wherein the method is further defined as inserting the end element into the singling groove by an amount sufficient to disengage the end element from the retaining means to permit removal of the end element from the stack.

8. The method according to claim 6 wherein the vacuum of the sucker is briefly altered to displace the end element into the singling groove.

9. The method of claim 8 wherein the vacuum of the sucker is briefly increased during displacement of the end element into the singling groove.

10. The method of claim 8 wherein the singling groove has a sensor responsive to the presence or absence of the end element in the groove and wherein the vacuum of the sucker is controlled in accordance with the condition of the sensor.

11. Apparatus for sequentially separating individual sheet-like elements from the end of a stack of elements such that the interval between sequentially separated end elements is controlled with respect to time, said apparatus comprising:

receptacle means in which the stack of elements is positioned, said receptacle means having an end toward which the elements move as individual elements are sequentially separated from the stack, said receptacle means having retaining means on said end engaging opposing edges of the end element of the stack for retaining the stack in the receptacle;

singling means mounted proximate said end of said receptacle means and having a singling groove alignable with one of the opposing edges of the end element of the stack, said singling groove having a width corresponding to the thickness of the end element; and vacuum sucker means proximate said end of said receptacle means, said vacuum sucker means including drive means for moving said vacuum sucker means in a time controlled, repetitive, operative cycle that includes moving said vacuum sucker means in a first direction parallel to the planes of the sheet-like end elements and in a second direction that is parallel to the planes of the sheet-like end elements and opposite to said first direction; in each operative cycle, said vacuum sucker means engaging an end element, laterally displacing the end element relative to the stack so that said one of said opposing edges of said end element is inserted into said singling groove and the other of said opposing edges is displaced out of engagement with said retaining means by movement in said first direction, removing the displaced end element from the stack by movement in said second direction, and releasing the separated end element from said vacuum sucker means in a manner such that end elements released in successive operative cycles of said vacuum sucker means are discharged from the apparatus with intervals controlled with respect to time between them.

12. The apparatus of claim 11 wherein said singling groove extends along a portion of said one of said opposing edges of the end element.

13. The apparatus of claim 12 wherein said singling means is disposed in the middle of said one of said opposing edges of the end element.

14. The apparatus of claim 11 wherein said retaining means are movable to a position permitting elements to be placed in said receptacle means.

15. The apparatus of claim 11 wherein said apparatus includes sensor means for detecting lateral displacement of the end element relative to the stack.

16. The apparatus according to claim 15 wherein said sensor means is coupled to said vacuum sucker means for altering the vacuum of the sucker means in accordance with the condition of the sensor means.

17. The apparatus of claim 11 wherein said singling groove is incorporated in a portion of said retaining means such that said one of said opposing edges of said end element may be inserted in the groove by movement of said vacuum sucker means in said first direction.

18. The apparatus of claim 17 wherein said retaining means includes a stop engaging said end element and formed by an edge of said singling groove.

19. Apparatus for sequentially separating individual sheet-like elements from the end of a stack of elements such that the interval between sequentially separated end elements is controlled with respect to time, said apparatus comprising:

receptacle means in which the stack of elements is positioned, said receptacle means having an end toward which the elements move as individual elements are sequentially separated from the stack, said receptacle means having retaining means on said end engaging opposing edges of the end element of the stack for retaining the stack in the receptacle means, said apparatus having means for moving said receptacle means parallel to the planes of the end elements;

singling means mounted proximate said end of said receptacle means and having a singling groove alignable with one of the opposing edges of the end element of the stack, said singling groove having a width corresponding to the thickness of the end element for receiving the end element responsive to relative movement between the end element and the stack produced by movement of said receptacle means, said movement removing the other of the opposing edges of the end element from said retaining means; and vacuum sucker means proximate said end of said receptacle means, said vacuum sucker means including drive means for moving said vacuum sucker means in a time controlled, repetitive, operative cycle that includes moving said vacuum sucker means parallel to the planes of the sheet-like end elements; in each operative cycle, said vacuum sucker means engaging an end element, removing the displaced end element from the stack by said parallel movement of said vacuum sucker means following movement of said receptacle means, and releasing the separated end element from said vacuum sucker means in a manner such that end elements released in successive operative cycles of said vacuum sucker means are discharged from the apparatus with intervals controlled with respect to time between them.

20. The apparatus of claim 19 wherein said singling groove extends along a portion of said one of said opposing edges of the end element.

21. The apparatus of claim 20 wherein said singling means is disposed in the middle of said one of said opposing edges of the end element.

22. The apparatus of claim 19 wherein said singling groove is incorporated in a portion of said retaining means such that said one of said opposing edges of said end element may be inserted in the groove by the relative movement produced by movement of said receptacle means.

23. The apparatus of claim 22 wherein said retaining means includes a stop engaging said end element and formed by an edge of said singling groove.

24. The apparatus of claim 19 wherein said retaining means are movable to a position permitting elements to be placed in said receptable means.

25. The apparatus of claim 19 wherein said apparatus includes sensor means for detecting lateral displacement of the end element relative to the stack.

26. The apparatus according to claim 25 wherein said sensor means is coupled to said vacuum sucker means for altering the vacuum of the sucker means in accordance with the condition of the sensor means.

* * * * *